United States Patent [19]

Moriyama

[11] Patent Number: 5,726,827
[45] Date of Patent: Mar. 10, 1998

[54] TAPE GUIDE DRIVE MECHANISM FOR MAGNETIC RECORDING-REPRODUCTION DEVICE IN WHICH THE TAPES ARE DRIVEN BY A SLIDE MEMBER DRIVEN DIRECTLY BY CAM

[75] Inventor: Masahiro Moriyama, Osaka, Japan

[73] Assignee: Sanyo Electric Co., Ltd., Moriguchi, Japan

[21] Appl. No.: 681,534

[22] Filed: Jul. 23, 1996

[30] Foreign Application Priority Data

Jul. 25, 1995 [JP] Japan .................................. 7-189146

[51] Int. Cl.$^6$ .......................... G11B 5/027; G11B 5/008
[52] U.S. Cl. .......................... 360/85; 360/95; 242/346.1
[58] Field of Search .................... 360/85, 95; 242/346.1, 242/346.2

[56] References Cited

U.S. PATENT DOCUMENTS 4,975,793  12/1990  Oka .................................. 360/85

FOREIGN PATENT DOCUMENTS

| 0 331 043 | 9/1989 | European Pat. Off. . |
|---|---|---|
| 0 404 426 | 12/1990 | European Pat. Off. . |
| 0 435 207 | 7/1991 | European Pat. Off. . |
| 2 475 775 | 8/1981 | France . |
| 60-106058 A | 6/1985 | Japan . |
| 2 268 616 | 1/1994 | United Kingdom . |

Primary Examiner—A. J. Heinz
Attorney, Agent, or Firm—Armstrong, Westerman, Hattori, McLeland & Naughton

[57] ABSTRACT

A chassis mounting thereon a drive slide for rotating tape guides arranged within a cassette in a tape withdrawing direction, and a cam gear for driving the drive slide. The cam gear and the drive slide provide a linear motion mechanism for connecting the drive slide with the cam gear by the rotation of the cam gear through a predetermined angle and disengaging the drive slide from the cam gear by the rotation of the cam gear through more than the predetermined angle. A lock mechanism is provided for connecting the drive slide with the chassis when the drive slide is out of connection with the cam gear and disengaging the drive slide from the chassis when the drive slide is connected with the cam gear.

4 Claims, 8 Drawing Sheets

FIG.11 PRIOR ART

TAPE GUIDE DRIVE MECHANISM FOR MAGNETIC RECORDING-REPRODUCTION DEVICE IN WHICH THE TAPES ARE DRIVEN BY A SLIDE MEMBER DRIVEN DIRECTLY BY CAM

BACKGROUND OF THE INVENTION

1. Field of the Invention

The present invention relates to a mechanism for use in recording-reproduction devices for recording and reproducing signals with use of a magnetic tape traveling while being guided by tape guides, the mechanism being adapted to drive the tape guides between a standby position within a cassette and a guide position toward a rotary cylinder.

2. Description of the Related Art

Figure 10:
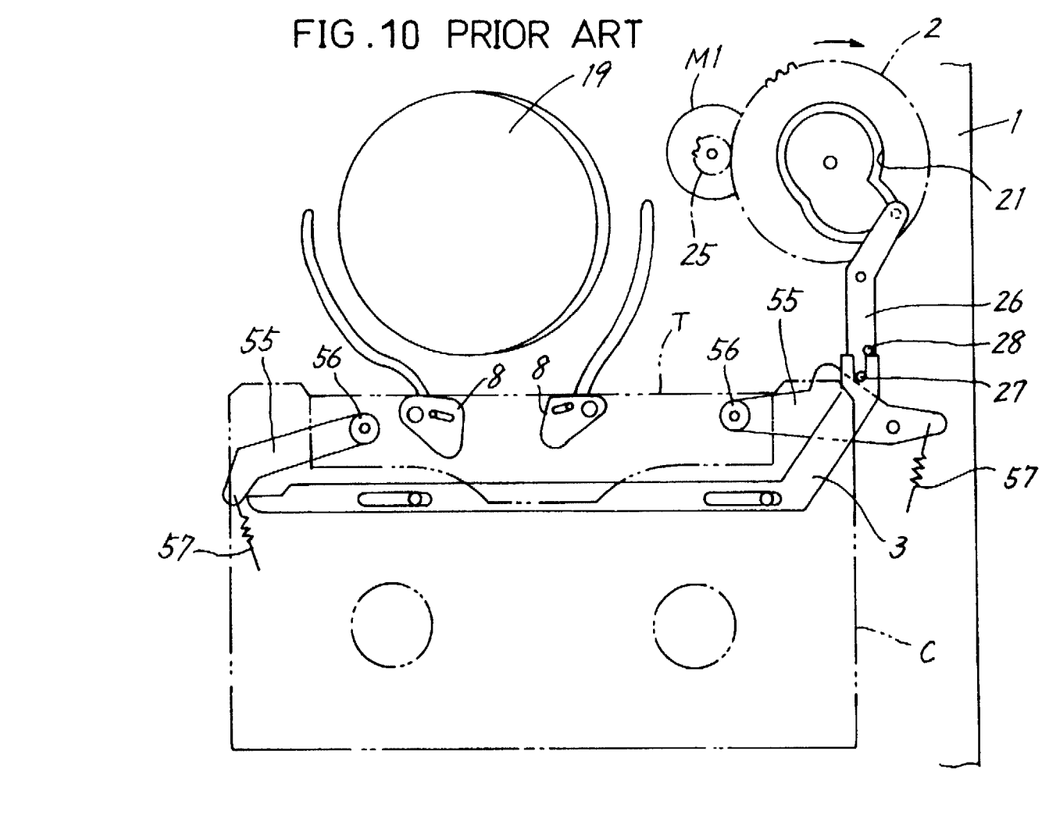
FIG. 10 is a plan view showing withdrawing guides as positioned within a cassette in a conventional recording-reproduction device.
Figure 11:
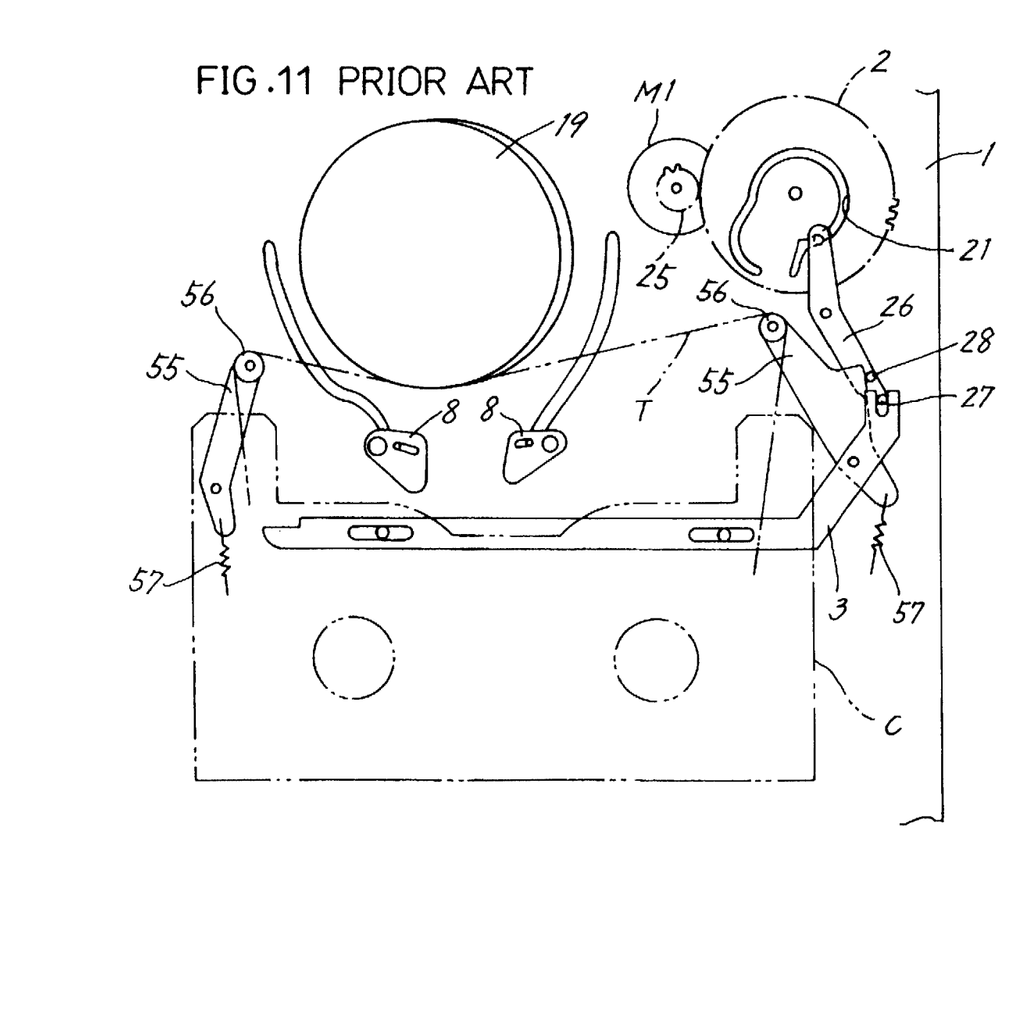
FIG. 11 is a plan view showing the withdrawing guides as drawn out.

FIGS. 10 and 11 show a conventional mechanism for use in recording-reproduction devices for driving tape guides for guiding the travel of the magnetic tape (see JP-A-106058/1985).

A pair of leading guide blocks 8, 8 for loading a magnetic tape T onto a rotary cylinder 19 from a cassette C is disposed on a chassis 1 within the position where the cassette C is placed thereon. Guides 5, 5 for withdrawing the tape T are arranged on respective opposite sides of the pair of guide blocks 8, 8. Each of the withdrawing guides 55 carries an upright roller 56 on a forward end thereof and is biased by a spring 57 toward the direction of withdrawing the tape.

As shown in FIG. 10, the left withdrawing guide 55 is in contact with a drive slide 3 slidable rightward and leftward and thereby restrained from rotating in the tape withdrawing direction while the tape is not loaded.

A loading motor M1, which is provided at one side of the rotary cylinder 19, is coupled by a gear 25 on the motor shaft to a cam gear 2 formed with a cam groove 21 in the upper surface thereof. A pivotal lever 26 supported at its central portion on the chassis 1 has one end engaged in the cam groove 21 and is provided at the other end thereof with a pin 27 engaging with the drive slide 3. Between the central portion and the pin 27, the pivotal lever 26 has a stopper pin 28 projecting therefrom and positioned closer to the pin 27. The right withdrawing guide 55 is positioned at a level between the upper surface of the pivotal lever 26 and the lower surface of the drive slide 3, and is in contact with the pin 27 of the lever 26 and restrained from rotation while the tape is not loaded.

For loading, the cam gear 2 rotates clockwise with the rotation of the loading motor M1, rotating the pivotal lever 26 counterclockwise as shown in FIG. 11 and sliding the drive slide 3 rightward. The movement of the pivotal lever 26 and the drive slide 3 releases the withdrawing guides 55, 55 from the restraint for rotation in the tape withdrawing direction. The magnetic tape T is withdrawn in contact with the rollers 56, 56 and comes into contact with the periphery of the rotary cylinder 19 as seen in FIG. 11. The pivotal lever 26 stops at this position. The magnetic tape T is held in contact with the right and left rollers 56, 56 and thereby allowed to travel with reduced resistance. In this state, the tape T can be forwarded fast and rewound with good stability.

The sliding stroke of the drive slide 3 is dependent on the amount of rotation of the pivotal lever 26. Accordingly, an increase in the sliding stroke requires an increase in the diameter of the cam gear 2 for an increase in the amount of rotation of the lever 26, or an alteration in the distance from the pivot of the lever 26 to the pin 27.

With the recording-reproduction device described, however, the space needed for providing the pivotal lever 26 between the cam gear 2 and the drive slide 3 requires that the device be large-sized Furthermore, an attempt to give an increased diameter to the cam gear 2 to increase the sliding stroke of the drive slide 3 requires an increase in the overall size of the device. Whereas digital VTRs are required to have a compact overall size, the increase in the overall size of the device is in conflict with the demand of the market.

Figure 5:
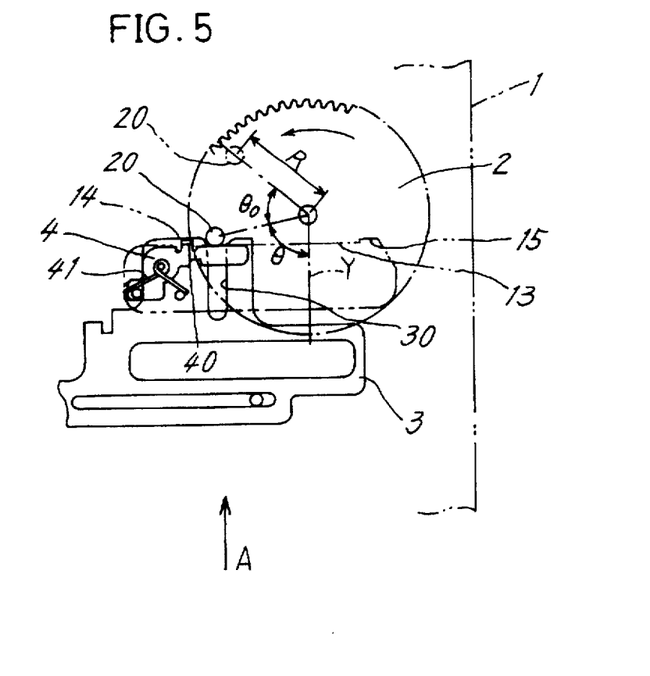
FIG. 5 is an enlarged plan view of a cam gear and components adjacent thereto in the unloaded state.

The inventor therefore conceived the idea of causing the cam gear 2 to directly move the drive slide 3 by means of a mechanism provided by an operation pin 20 on the gear 2 and the drive slide 3 for converting a rotational motion into a linear motion as shown in FIG. 5. With this mechanism, the sliding stroke L of the drive slide 3 is expressed by:

$$L = 2R \sin \theta$$

wherein R is the length of a phantom line extending from the center of the cam gear 2 to the operation pin 20, and θ is the angle the phantom line makes with a line Y orthogonal to the direction of movement of the slide 3. However, the linear motion mechanism involves the likelihood that if the angle of rotation of the cam gear 2 is great, the operation pin 20 will disengage from the slide 3 during the rotation of the cam gear 2. If an external impact acts on the mechanism in this case with the pin 20 out of engagement with the slide 3, the drive slide 3 will shift, possibly failing to smoothly move subsequently.

SUMMARY OF THE INVENTION

An object of the present invention is to cause a cam gear to directly move a slide member for driving tape guides in a withdrawing direction to provide a compact device, and to prevent the slide member from shifting when the slide member is out of engagement with the cam gear.

According to the invention, a cam gear 2 and a drive slide 3 provide a linear motion mechanism permitting the drive slide 3 to be disengaged from the cam gear 2 by the rotation of the cam gear 2 through more than a predetermined angle, and a lock mechanism is provided for engaging the drive slide 3 with a chassis 1 when the drive slide 3 is out of engagement with the cam gear 2 and disengaging the drive slide 3 from the chassis 1 when the drive slide 3 is in engagement with the cam gear 2.

When the drive slide 3 is out of engagement with the cam gear 2, therefore, the lock mechanism holds the drive slide 3 in engagement with the chassis 1, consequently preventing the drive slide 3 from shifting or displacement even if the slide is subjected to an external impact. Further when the cam gear 2 comes into engagement with the drive slide 3, the lock mechanism disengages the drive slide 3 from the chassis 1, enabling the drive slide 3 to slide on the chassis 1 smoothly.

DESCRIPTION OF THE PREFERRED EMBODIMENT

A recording-reproduction device embodying the invention Will be described below. Throughout the drawings, like parts are designated by like reference numerals and will not be described repeatedly.

Figure 1:
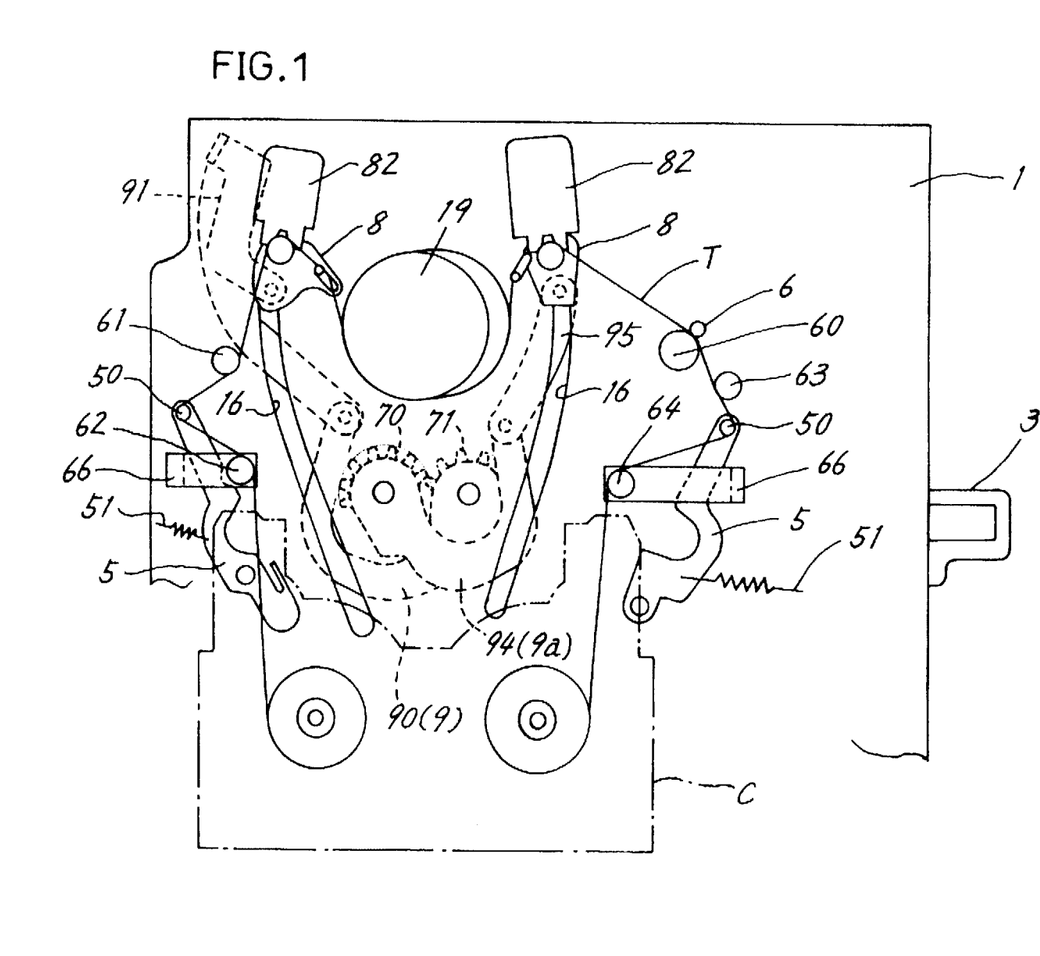
FIG. 1 is a plan view showing a chassis in a tape loading completed state.
Figure 2:
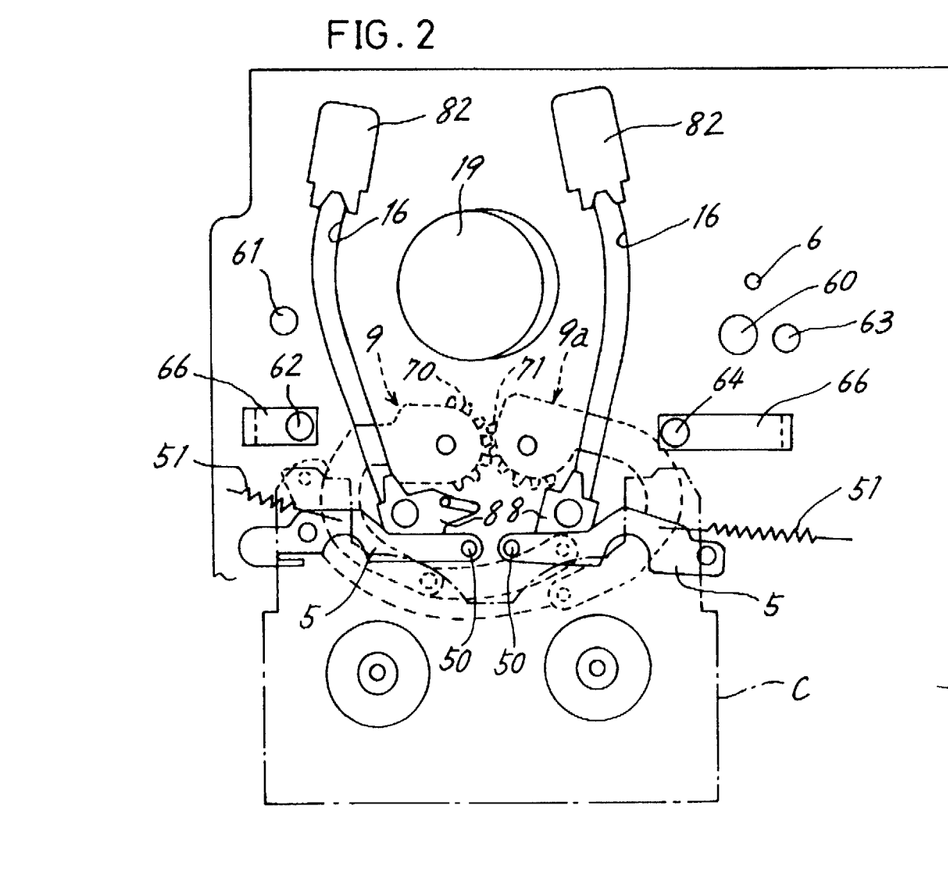
FIG. 2 is a plan view of the chassis in an unloaded state.

FIG. 1 is a plan view of a chassis 1 in a tape loading completed state, and FIG. 2 is a plan view of the chassis 1 in an unloaded state.

Guide grooves 16, 16 for fitting a pair of leading guide blocks 8, 8 in respectively are formed in the chassis 1 at opposite sides of a rotary cylinder 19 mounted thereon. At a loading completed position, catchers 82, 82 for the respective guide blocks 8, 8 to come into pressing contact with are provided at forward ends of the guide grooves 16, 16. In the following description, the left side of the rotary cylinder 19 will be referred to as the "S side," and the right side thereof as the "T side."

The leading guide blocks 8, 8 are driven as fitted to respective loading links 9, 9a pivoted to the rear side of the chassis 1. The loading link 9 at the S side comprises two link plates 90, 91 pivoted to each other, and the loading link 9a at the T side two similar link plates 94, 95. Loading gears 70, 71 for rotating the respective loading links 9a, 9 are each fitted to the base end of the link. The loading gears 70, 71 are in mesh with each other. The loading gear 71 fitting to the S-side loading link 9 is positioned at the right side of the loading gear 70 for drivingly rotating the T-Side loading link 9a.

In the unloaded state shown in FIG. 2, the guide blocks 8, 8 are in a standby position at base ends of the guide grooves 16, 16. In the vicinity of the standby position, a pair of tension levers 5, 5 are disposed each of which has at a forward end thereof a tension post 50 in contact with a magnetic tape T and is biased in a tape withdrawing direction by a spring 51.

Figure 9:
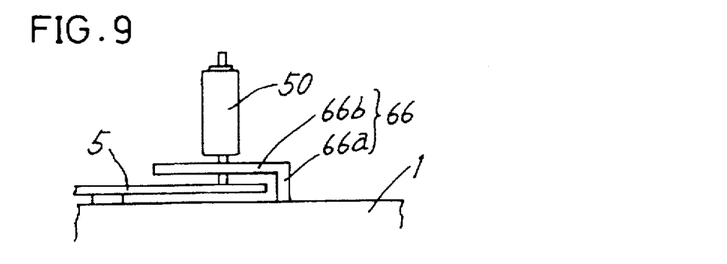
FIG. 9 is a front view of a support piece.

The two tension levers 5, 5 in the unloaded state are restrained from rotating in the withdrawing direction by the drive slide 3 to be described below. Two fixed guides 61, 62 are provided upright in the vicinity of a completely rotated position of the left tension lever 5, and fixed guides 63, 64 in the vicinity of a completely rotated position of the right tension lever 5. Of these, the fixed guides 62, 64 closer to a cassette are each provided on a support piece 66 on the chassis 1. The support piece 66 comprises a vertical portion 66a projecting upward from the chassis 1, and a horizontal portion 66b projecting inwardly of the chassis 1 from the upper end of the vertical portion 66a and integral therewith (see FIG. 9). During tape loading, the tension lever 5 advances into a space between the horizontal portion 66b and the chassis 1.

The tension lever 5 of the present embodiment gives a predetermined tension to the magnetic tape T and differs from the withdrawing guide 55 of the conventional device, but is the same as the guide 55 in that the lever 5 carries at its forward end a tape guide member for contact with the magnetic tape T and rotates from a position inside the cassette toward the tape withdrawing direction.

A capstan 6 projects upward from the chassis 1 at the right side of the rotary cylinder 19. Disposed in the vicinity of the capstan 6 is a pinch roller 60 movable into pressing contact with the capstan 6 for transporting the magnetic tape T as held between the roller and the capstan. The pinch roller 60 is suspended from above by an unillustrated pinch lever, lowered from above along with the pinch lever for recording or reproduction and pressed against the capstan 6 by the rotation of the pinch lever. The pinch lever mechanism is disclosed in JP-B-19412/1995 and already known.

When the magnetic tape T is used for recording or reproduction on completion of loading, the tape T is in contact with the fixed guides 62, 61 and the tension post 50 of the left tension lever 5, wound around the rotary cylinder 19, then held between the capstan 6 and pinch roller 60, held in contact with the fixed guides 63, 64 and the tension post 50 of the right tension lever 6 and wound within the cassette C.

Figure 3:
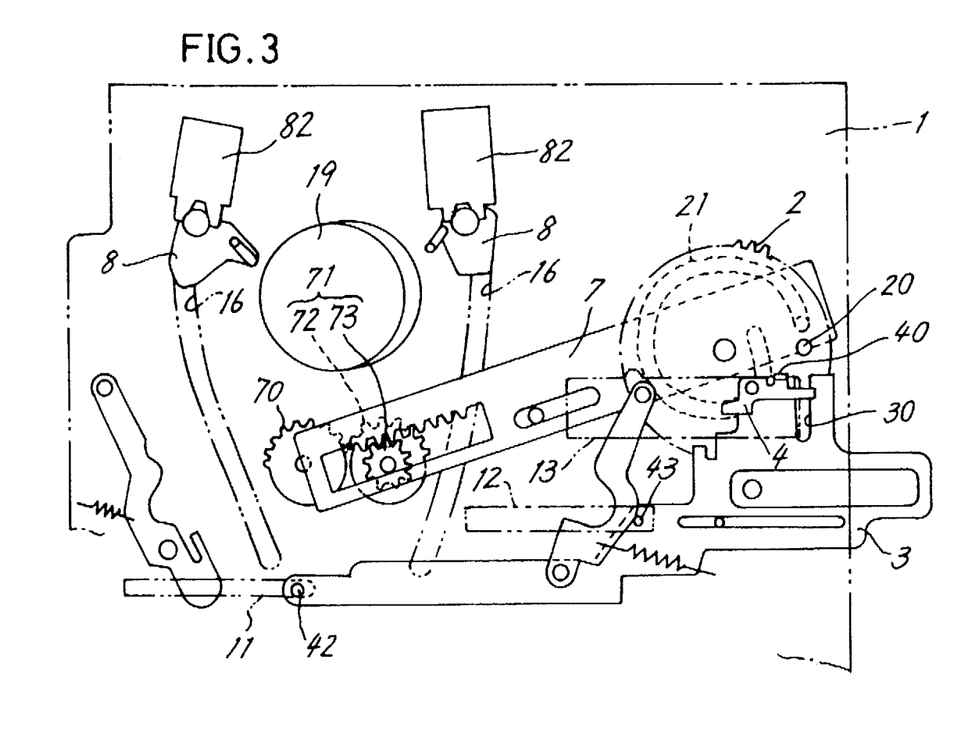
FIG. 3 is a plan view of components attached to the rear side of the chassis in a loaded state.
Figure 4:
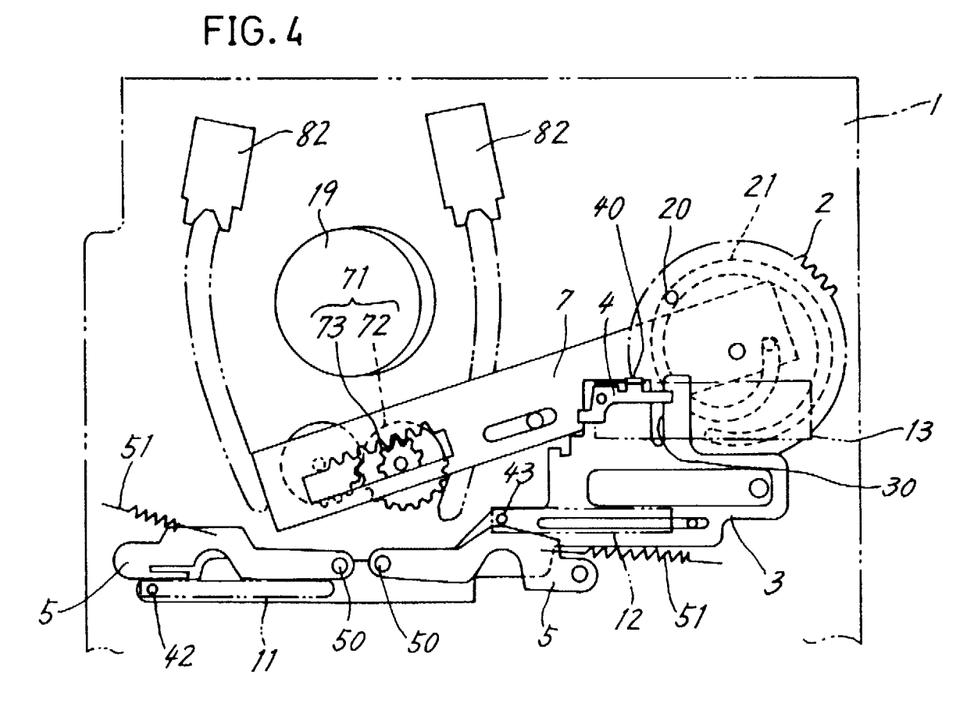
FIG. 4 is a plan view of the components attached to the rear-side of the chassis in the unloaded state.

FIGS. 3 and 4 are plan views showing mechanisms arranged on the rear side of the chassis 1. The chassis 1 is indicated in a two-dot-and-dash line. A cam gear 2 is rotatably provided on the rear side of the chassis 1. A loading rack 7 meshing with the S-side loading gear 71 is fitted in a cam groove 21 formed in the lower surface of the cam gear 2. The cam gear 2 is drivingly rotated by an unillustrated motor.

The S-side loading gear 71 comprises two gear portions at different levels, i.e., a large gear 72 meshing with the T-side loading gear 70 and a small gear 73 positioned on the large gear 72. The loading rack 7 meshes with the small gear 73. The large gear 72 is locally toothless, that is, the gear 72 has teeth along only a portion of its periphery, and provides a Geneva motion along with the T-side loading gear 70. On completion of loading, the S-side and T-side loading gears 71, 70 are brought out of meshing engagement with each other to hold the guide blocks 8 pressed against the respective catchers 82.

An operation pin 20 is mounted on the upper surface of the cam gear 2. Disposed between the upper surface of the cam gear 2 and the rear surface of the chassis 1 is a drive slide 3 which is reciprocatingly movable rightward and leftward.

The drive slide 3 is formed with a vertical groove 30 which extends orthogonally to the direction of sliding movement of the drive slide 3 and in which the operation pin 20 on the cam gear 2 is engageable. The drive slide 3 has pins 42, 43 projecting upward from the left end and longitudinal midportion thereof, respectively. The chassis 1 is formed with laterally elongated first slot 11 and second slot 12 at locations corresponding to the projecting pins 42, 43, respectively. The pins 42, 43 extend through the first and second slots 11, 12 and bear on the respective tension levers 5, 5 each at a side edge thereof. As shown in FIGS. 4 and 2, the tension levers 5, 5 are restrained from rotating in the tape withdrawing direction by the projecting pins 42, 43, with the tension posts 50, 50 positioned within the cassette C.

Figure 6:
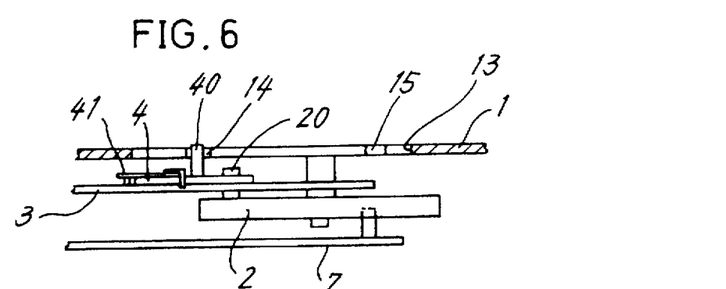
FIG. 6 is a view showing the same as seen from the direction A in FIG. 5.
Figure 7:
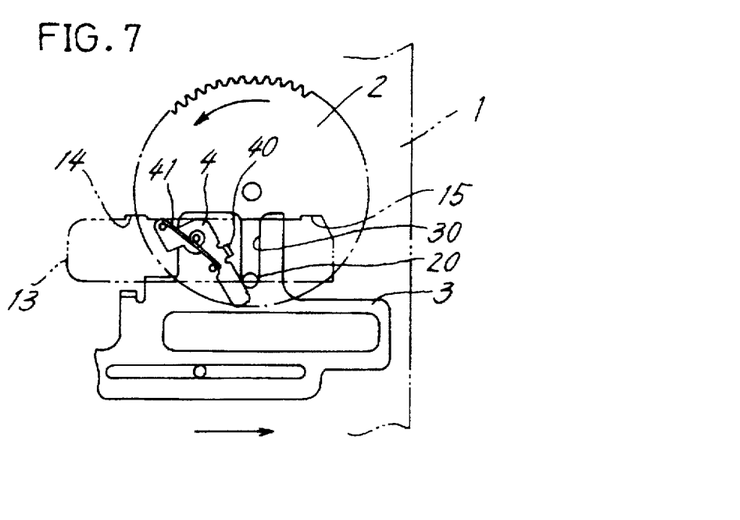
FIG. 7 is an enlarged plan view of the cam gear and the adjacent components during transition to loading.

The drive slide 3 has a feature of the invention. FIGS. 5 and 7 are enlarged views showing the cam gear 2 and components in the vicinity thereof, and FIG. 6 is a view showing the same as seen from the direction A of FIG. 5. The chassis 1 has a third slot 13 lapping over the vertical groove 30 of the drive slide 3. The chassis front edge defining the third slot 13 has recessed portions 14, 5 spaced apart from each other and corresponding to the sliding completed positions of the drive slide 3.

A lock lever 4 is pivotably mounted on the drive slide 3 at the left side of the vertical groove 30 and biased counterclockwise by a torsion spring 41 fitted around the pivot of the lock lever 4. An engaging projection 40 projecting upward from the lock lever 4 is fittable in the recessed portion 14 or 15 formed in the third slot 13. In the unloaded state, the engaging projection 40 of the lock lever 4 fits in the left recessed portion 14, restraining the lock lever 4 from rotating counterclockwise and preventing the drive slide 3 from shifting rightward or leftward. The lock lever 4 has a forward end portion orthogonal to the vertical groove 30 and extending across and covering the groove 30. In the unloaded state, the operation pin 20 of the cam gear 2 is at a position an angle θ0 clockwise away from the open end of the vertical groove 30 as indicated in a two-dot-and-dash line in FIG. 5.

For loading the tape T, the cam gear 2 rotates counterclockwise. The loading rack 7 slidingly moves obliquely rightward as shown in FIG. 3, and the S-side loading gear 71 rotates clockwise. The T-side loading gear 70 rotates counterclockwise in meshing engagement with the S-side loading gear 71. The loading links 9, 9a rotate in the loading direction.

When the cam gear 2 rotates counterclockwise through the angle θ0 from its standby position, the operation pin 20 reaches the open end of the vertical groove 30 as shown in FIG. 5. The operation pin 20 fits into the groove 30 while rotating the lock lever 4 clockwise against the biasing force of the torsion spring 41. The engaging projection 40 of the lock lever 4 disengages from the recessed portion 14, rendering the drive slide 3 slidable. Further counterclockwise rotation of the cam gear 2 causes the operation pin 20 to move the drive slide 3 rightward as shown in FIG. 7.

Since the drive slide 3 moves rightward, the tension posts 50, 50 restrained from rotation by the projecting pins 42, 43 rotate in the tape withdrawing direction from the state shown in FIG. 4.

Figure 8:
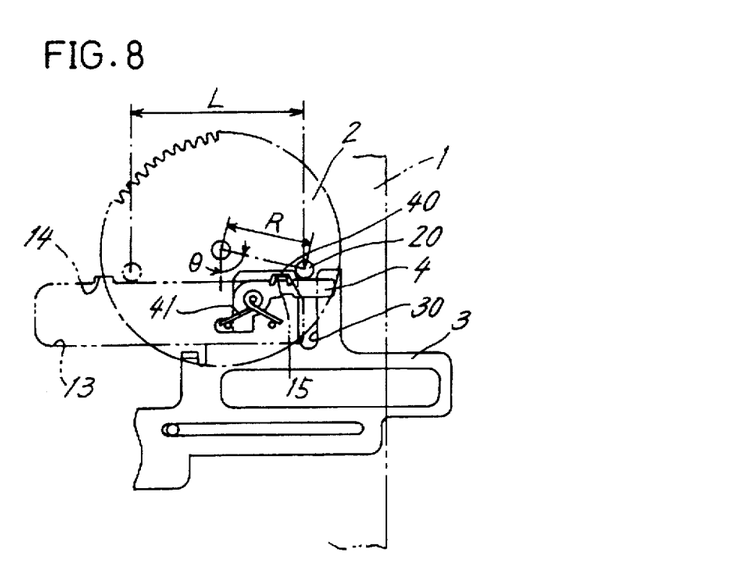
FIG. 8 is an enlarged plan view of the cam gear and the adjacent components in the loading completed state.

Upon reaching the loading completed position, the leading guide blocks 8 come into pressing contact with the respective catchers 82 as seen in FIG. 3. The operation pin 20 of the cam gear 2 moves out of the vertical groove 30 as shown in FIG. 8. The lock lever 4 restrained from rotation by the operation pin 20 is returned to its original position by the torsion spring 41, with the engaging projection 40 thereof brought into engagement with the right recessed portion 15. Consequently, the drive slide 3 is locked to the chassis 1.

Now, assume the sliding stroke of the drive slide 3 from the unloaded state until the completion of loading is L (see FIG. 8). Assuming that the length of a phantom line extending from the center of the cam gear 2 to the operation pin 20 is R, and that the angle of the phantom line makes with a straight line orthogonal to the direction of sliding movement of the slide 3 is θ, the sliding stroke L is expressed by:

$$L = 2R \sin \theta$$

Accordingly, if the angle θ is made close to 90 deg, the sliding stroke can be increased to about twice the distance R.

Thus, the lock lever 4 is in engagement with the chassis 1 while the drive slide 3 is out of engagement with the cam gear 2, so that the drive slide 3 can be prevented from shifting if subjected to vibration or impact from outside. Since the cam gear 2 is adapted to directly move the drive slide 3, the number of components can be reduced. Further when the drive slide 3 and the cam gear 2 provide the linear motion mechanism with the angle θ made close to 90 deg, the sliding stroke can be set to approximately twice the distance from the operation pin 20 to the center of the cam gear 2 without increasing the size of the cam gear 2.

When the tape as loaded is to be unloaded, the cam gear 2 is rotated clockwise, i.e., in a direction opposite to the loading direction. The operation of the lock lever 4 in this case is the same as already described and therefore will not be described in detail.

The device of the invention is not limited to the foregoing embodiment in construction but can be modified variously within the scope defined in the appended claims.

What is claimed is:

1. A tape guide drive mechanism for a magnetic recording-reproduction device wherein a chassis has mounted thereon a drive slide for moving tape guide members positioned within a cassette in a tape withdrawing direction and a cam gear for driving the drive slide, the tape guide drive mechanism comprising:

a linear motion connection means for connecting the drive slide with the cam gear by the rotation of the cam gear through a predetermined angle and for disconnecting the drive slide from the cam gear by the rotation of the cam gear through more than the predetermined angle, and a lock means for connecting the drive slide with the chassis when the drive slide is out of connection with the cam gear and for disconnecting the drive slide from the chassis when the drive slide is connected with the cam gear.

2. A tape guide drive mechanism as recited in claim 1 wherein the linear motion connection means comprises:

an operation pin mounted on the cam gear; and a vertical groove orthogonal to the direction of sliding movement of the drive slide for releasable fitting the operation pin in with the rotation of the cam gear.

3. A tape guide drive mechanism as recited in claim 2, wherein the lock means comprises:

recessed portions formed in the chassis; and a lock lever pivotably mounted on the drive slide and having a connecting projection engageable with the recessed portion of the chassis and a free end portion extending across the vertical groove, the lock lever being biased in a direction to connect the connecting projection with the recessed portion and downwardly pushable by the operation pin fitting into the vertical groove to disconnect the connecting projection from the recessed portion.

4. A tape guide drive mechanism as recited in claim 1, wherein leading guide blocks are provided on the chassis for loading a tape from the cassette, and the cam gear is fitted to a loading rack for driving the leading guide blocks, the leading guide blocks being slidable in a loading direction with the rotation of the cam gear for the start of loading, the drive slide being thereafter slidable to withdraw the tape guide members.

\* \* \* \* \*